Dec. 16, 1947.   M. LIEBLICH   2,432,911
MUTUAL CONDUCTANCE APPARATUS
Filed Nov. 4, 1944
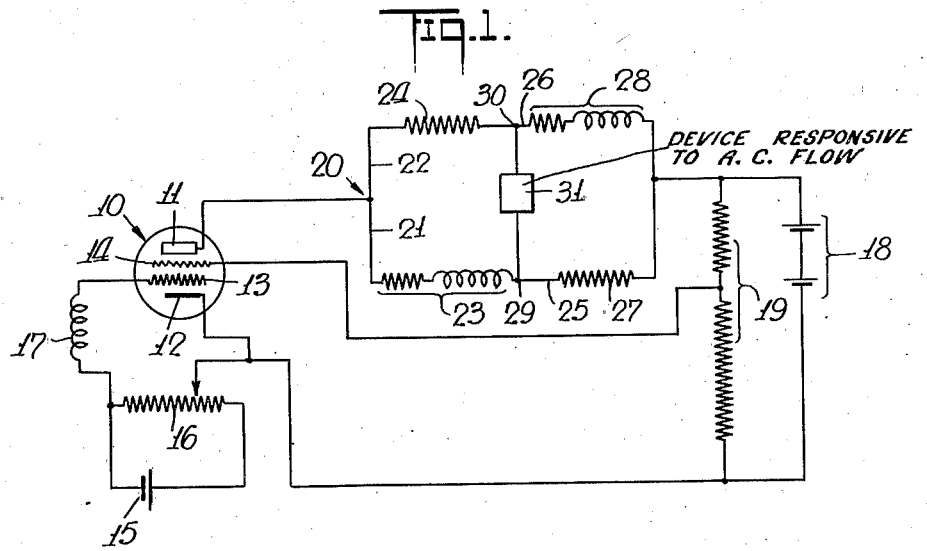
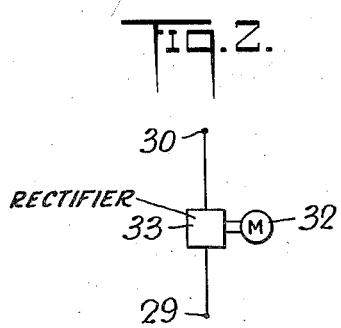
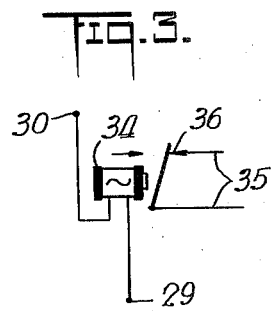
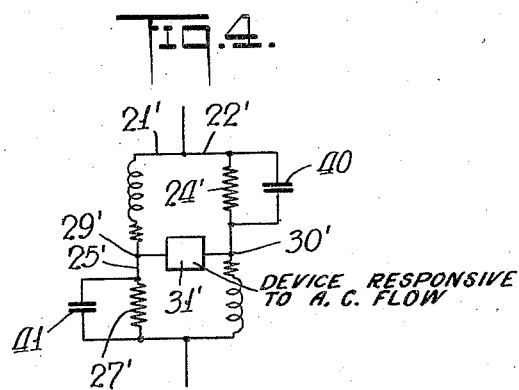
INVENTOR
*Morris Lieblich*
BY
*Harry Ernest Rubens*
ATTORNEY
44-225

Patented Dec. 16, 1947

2,432,911

UNITED STATES PATENT OFFICE 2,432,911

MUTUAL CONDUCTANCE APPARATUS

Morris Lieblich, Brooklyn, N. Y., assignor to Radio City Products Co., Inc., a corporation of New York Application November 4, 1944, Serial No. 562,001

2 Claims. (Cl. 315—368)

My invention relates to a circuit which may be used with a vacuum tube for determining the mutual conductance of the tube.

Among the objects of my invention are: to provide a circuit whereby the mutual conductance of a vacuum tube may be measured in absolute units such as micromhos, or on a comparative scale; to provide a bridge circuit which is balanced with respect to the normal D. C. plate current of a vacuum tube and which is unbalanced by the alternating current component of the plate current produced by the introduction of an alternating current signal in the grid of the tube under test; to provide a bridge circuit substantially balanced for D. C. current and unbalanced for A. C. current, and having an apparatus connecting the points of D. C. balance which is responsive to the unbalanced A. C. current in the bridge; to provide a mutual conductance vacuum tube measuring device which is not affected by the normal plate current obtained from the tube under test but which will measure the A. C. component of the plate current, produced by the introduction of an A. C. signal in the grid; and to provide a bridge circuit which is balanced for a specified current and unbalanced for another and different current so that an apparatus connected across two points of balance for the specified current will be responsive only to the unbalanced current.

I accomplish these and other objects and obtain my new results as will be apparent from the device described in the following specification, particularly pointed out in the claims, and illustrated in the accompanying drawing, in which:

Fig. 1 is a circuit diagram illustrating the invention connected to a vacuum tube.

Fig. 2 illustrates a D. C. meter provided with a rectifier which may be placed across the points of equal D. C. potential in the bridge for measuring the A. C. component of the plate current.

Fig. 3 represents a relay which may be used across the bridge, and which is responsive to the A. C. component of the signal current for controlling any desired operation.

Fig. 4 represents a modification of the bridge elements.

In Fig. 1 of the drawings, there is illustrated a vacuum tube 10 provided with typical circuit connections.

In the plate circuit I have inserted a bridge arrangement 20 which enables me to secure the objects of my invention.

The various elements of the tube 10 are the plate 11, cathode 12, grid 13, and a screen grid 14.

A D. C. bias is applied to the grid of the tube 10 which is obtained from the battery 15, through the variable resistor 16, connected to the coil 17, which supplies the signal to the grid 13. The coil is energized by any suitable means.

The plate and screen grid voltages are provided by a battery 18 across the resistance 19. The battery and resistance connection is completed by a lead to the cathode 12.

The foregoing, as has been stated, is a typical vacuum tube circuit, and changes may be made therein without departing from the spirit of the invention.

In the plate circuit, the bridge 20 comprises four arms each containing an element providing resistance to the current flow and in at least one of said arms, an inductance, for a purpose which will be hereinafter made clear.

In the specific arrangement, the plate is connected to arms 21, and 22, containing elements 23 and 24 respectively. Element 23 may be designed with a resistance of value "$r_{23}$" and an inductance of value "$l_{23}$." The two remaining arms 25 and 26 are similarly provided with elements 27 and 28, wherein element 27 may have a resistance of value "$r_{27}$," and element 28 with a resistance of value "$r_{28}$" and an inductance of value "$l_{28}$."

Across the bridge 20, and connecting the points 29 and 30, between arms 23 and 25, and 22 and 26 respectively, is positioned a device 31, responsive to any current flowing between these two points.

If the resistance values are all equal, or if they bear the relationship $$\frac{r_{24}}{r_{23}} = \frac{r_{28}}{r_{27}}$$

then the bridge will be balanced for any D. C. current flowing through the bridge and no D. C. current will flow between points 29 and 30.

The bridge so designed, is unbalanced for A. C. by the elements 23 and 28, which have been provided with inductance values $l_{23}$ and $l_{28}$. An alternating current will therefore flow through the device 31, between the points 29 and 30. It may be noted that although elements 23 and 28 only have been provided with inductance values, $l_{23}$ and $l_{28}$; elements 24 and 27 may also possess inductance values, provided $$\frac{(2\pi f l_{24})^2 + r_{24}^2}{(2\pi f l_{23})^2 + r_{23}^2} \neq \frac{(2\pi f l_{28})^2 + r_{28}^2}{(2\pi f l_{27})^2 + r_{27}^2}$$

Instead of inductance values, capacitance values may be used with similar results; indeed, combinations of both are desirable (see Fig. 4).

Device 31, may be an A. C. measuring instrument such as is shown in Fig. 2, containing a D. C. meter 32 provided with a rectifier 33. Or it may be a relay 34, for controlling a separate circuit 35, at connection 36, for performing any predetermined function, based upon the existence, or the magnitude, of any current flowing between points 29 and 30 of the bridge.

If it is assumed that the grid signal current has not been impressed on the grid 13, only a normal D. C. plate current will flow through the bridge 20. The bridge having been designed to create equal D. C. potential at points 29 and 30, if the meter is connected across the points, no current flow will be indicated between said points.

Upon the introduction of the signal voltage of an A. C. character, the bridge being unbalanced for such A. C. component of the plate current, the meter will register the magnitude of the current that will pass between points 29 and 30.

The meter can be calibrated in micromhos or on some comparative scale. This will be evident from the following:

Since $$G_m = \frac{\Delta I_p}{E_s}$$

where $G_m$=mutual conductance, and
$\Delta I_p$=change in plate current, and
$E_s$=voltage generated across winding 17 then:

$\Delta I_p = E_s G_m$, or, for any given signal, the change in the A. C. component of the plate current is proportional to the mutual conductance of the tube under test, and can be used as a measure of the mutual conductance after taking into account the factor of proportionality which would depend upon the magnitude of the A. C. signal being used.

When all the arms of the bridge, including the branch containing the indicating instrument have resistances or impedances which are constant at any given frequency and are not affected by current density, then a fixed portion of the total plate current will flow in all of the branches so that the meter can be linearly calibrated in terms of the total plate current flowing in the circuit.

Since it has been shown that the plate current is proportional to the mutual conductance of the tube under test for any given applied signal to the grid of the tube, the indicating instrument can thus be calibrated in terms of the mutual conductance of the tube.

When the branch containing the indicating instrument does not present a constant impedance to the currents of varying values, the inductances are designed so that the ratio of the impedance to the D. C. resistance at line frequency or at higher frequencies is made very high, that is, $2\pi fL \gg R$. In this case, the value of the A. C. current that will flow through the inductances as compared to the current which will flow through the resistances will be negligible. A modification of the bridge in Fig. 1 is shown in Fig. 4 wherein a more complete by-passing of the A. C. current through the arms 22', 25' and between points 29' and 30' is assured. This consists in providing each of the resistances 24' and 27' with parallel capacitances 40 and 41 respectively, which will reduce the effective impedance in said arms. Moreover, the rectifier resistance can be made negligible as compared to the lowest resistance of any tube being tested, so that a slight change in rectifier impedance will not noticeably affect the total resistance of the A. C. current path.

It will be noted that elements 23, and 28, each possessing values of resistance and inductance are positioned on the opposite and non-adjacent sides of the bridge. The advantage from such an arrangement is that maximum unbalance for a given change in plate current is produced thereby. This increases bridge sensitivity and insures a linear scale when using a rectifier with a D. C. meter.

By placing my bridge 20 in the plate circuit, I am able to determine the mutual conductance of the tube without having the determination affected by the change in screen grid current in addition to the change in plate current. A more accurate determination is therefore possible than by other systems, or by placing the bridge in the cathode circuit.

I have indicated that my novel circuit is useful, in combination with a vacuum tube circuit for determining the mutual conductance of a vacuum tube. In addition I have pointed out that an apparatus may be positioned across the bridge for controlling any desired operation dependent upon the existence, or magnitude of an unbalancing current. In this respect, it will be noted that the bridge arms may contain elements designed to maintain the balance of any predetermined current not having D. C. components, and of being unbalanced for other currents. An example of this is evident where at least one of the arms contains resistance, and at least one of the arms contains a reactance. Such a bridge may be balanced for current of a predetermined frequency and unbalanced for current of a different frequency, as is evident from the following, where the same elements are employed as are used in the bridge of Fig. 1, but where the values of resistance and reactance vary therefrom as follows:

$$\frac{r_{24}}{\sqrt{(2\pi f L_{28})^2 + r_{28}^2}} = \frac{\sqrt{(2\pi f L_{23})^2 + r_{23}^2}}{r_{27}}$$

where $f$ is the frequency of balance.

Where a different and unbalanced frequency $f_1$ is employed, the following condition exists:

$$\frac{r_{24}}{\sqrt{(2\pi f_1 L_{28})^2}} = \frac{\sqrt{(2\pi f_1 L_{23})^2 + r_{23}^2}}{r_{27}}$$

In the foregoing I have accomplished my primary object of devising a circuit which will eliminate the normal plate current while measuring the signal current impressed on the grid, and thus measure the mutual conductance of the tube.

The remaining objects are readily obtained by my circuit arrangement which may be used to control an apparatus which it is desired to operate under predetermined conditions.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A mutual conductance measuring apparatus for an amplifying vacuum tube which comprises terminal connections to the control grid, cathode, and plate of an amplifying tube; an input signal voltage circuit having a connection to the control grid terminal, providing a source of predetermined A. C. signal voltage; a grid bias potential circuit connected to the input signal voltage circuit, having a source of D. C. potential, a means for varying the potential, and a connection to the cathode terminal; and a plate circuit having connections to the plate and cathode terminals, a bridge, a source of D. C. plate potential in series therewith, said bridge having a pair of branches in parallel relationship with each other, each branch having an intermediate terminal and an A. C. indicating device arranged in cross-connection between the intermediate terminals, said bridge containing predetermined values of resistance and impedance producing a zero voltage across the intermediate terminal due to the D. C. component of the current in the plate circuit, and producing an A. C. voltage across the intermediate terminals due to the A. C. component of the plate current, said A. C. indicating device measuring the A. C. voltage which is a function of the mutual conductance of the tube under test when the predetermined signal voltage is applied to the grid of the tube.

2. The method of measuring the mutual conductance of an amplifying vacuum tube which comprises applying a predetermined input circuit signal voltage to the control grid of the tube to which a predetermined D. C. potential has been applied, connecting the plate circuit of the tube to which a predetermined D. C. potential has been applied to a bridge having intermediate terminals, and so arranged that the D. C. component of the current in the plate circuit produces zero voltage across the intermediate terminals; and placing an A. C. indicating device across the intermediate terminals of the bridge for measuring the A. C. voltage produced by the A. C. component of the plate current which is a function of the mutual conductance.

MORRIS LIEBLICH.

REFERENCES CITED

The following references are of record in the file of this patent:

UNITED STATES PATENTS

| Number | Name | Date |
| --- | --- | --- |
| 625,647 | Crehore & Squire | May 23, 1899 |
| 1,854,901 | Goodwin | Apr. 19, 1932 |
| 2,191,315 | Guanella | Feb. 20, 1940 |
| 2,192,035 | Evans | Feb. 27, 1940 |
| 2,305,307 | Wellenstein | Dec. 15, 1942 |
| 2,368,351 | Ewen | Jan. 30, 1945 |
| 2,378,846 | Hansell | June 19, 1945 |
| 1,920,906 | Goodwin | Aug. 1, 1933 |
| 1,989,394 | Aull | Jan. 29, 1935 |
| 2,031,925 | Bowles | Feb. 25, 1936 |